United States Patent
Kondalam et al.

(10) Patent No.: US 10,778,430 B2
(45) Date of Patent: Sep. 15, 2020

(54) GROUP BASED ENCRYPTION IN ENTERPRISE FABRIC ARCHITECTURES

(71) Applicant: Cisco Technology, Inc., San Jose, CA (US)

(72) Inventors: Satish Kondalam, Milpitas, CA (US); Victor M. Moreno, Carlsbad, CA (US); Sanjay Kumar Hooda, Pleasanton, CA (US); Muhammad Ahmad Imam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 15/968,189

(22) Filed: May 1, 2018

(65) Prior Publication Data

US 2018/0367302 A1    Dec. 20, 2018

Related U.S. Application Data

(60) Provisional application No. 62/522,014, filed on Jun. 19, 2017.

(51) Int. Cl.
*H04L 29/06* (2006.01)
*H04L 9/30* (2006.01)
*H04L 9/08* (2006.01)

(52) U.S. Cl.
CPC ............ *H04L 9/30* (2013.01); *H04L 9/085* (2013.01); *H04L 9/0841* (2013.01); *H04L 9/0866* (2013.01)

(58) Field of Classification Search
CPC ....... H04L 9/30; H04L 9/0841; H04L 9/0866; H04L 9/085
See application file for complete search history.

(56) References Cited

U.S. PATENT DOCUMENTS 7,908,482 B2 * 3/2011 Lauter ............... H04L 9/0844
380/277
2017/0289138 A1 * 10/2017 Ben-Shalom ......... H04L 63/065

* cited by examiner

*Primary Examiner* — Joseph P Hirl
*Assistant Examiner* — Chi D Nguy
(74) *Attorney, Agent, or Firm* — Merchant & Gould P.C.

(57) ABSTRACT

In accordance with various implementations, a method is performed at a source node of a fabric network coupled to a plurality of hosts respectively associated with a plurality of group identifiers. The method includes generating a source public key based on a source private key, a source group identifier of the plurality of group identifiers, and a destination group identifier of the plurality of group identifiers. The method includes sending, from the source node coupled to at least one host associated with the source group identifier to a destination node coupled to at least one host associated with the destination group identifier, the source public key. The method includes receiving, at the source node from the destination node, a destination public key based on a destination private key, the source group identifier, and the destination group identifier. The method further includes generating a shared secret based on the destination public key and the source private key.

19 Claims, 4 Drawing Sheets

GROUP BASED ENCRYPTION IN ENTERPRISE FABRIC ARCHITECTURES

CROSS-REFERENCE TO RELATED APPLICATIONS

This application claims priority to U.S. Provisional Patent App. No. 62/522,014, filed on Jun. 19, 2017, which is hereby incorporated by reference in its entirety.

TECHNICAL FIELD

The present disclosure generally relates generally to encryption, and in particular, encryption of data transmitted over fabric networks.

BACKGROUND

Enterprise fabric networks are involving an increasing number of endpoint devices across different types of user groups. Accordingly, there is an increase in network traffic. Keeping data confidential between the different types of user groups poses a challenge, especially when data is encrypted irrespective of what user group the user belongs to. Additionally, it can be challenging to ensure secure communication within user groups. These challenges are especially compounded in fabric architectures with a group-based policy.

BRIEF DESCRIPTION OF THE DRAWINGS

For a better understanding of aspects of the various implementations described herein and to show more clearly how they may be carried into effect, reference is made, by way of example only, to the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for generating a shared secret that may be used to encrypting data transmitted over a fabric network. For example, in some implementations, a method is performed at a source node of a fabric network, wherein the fabric node is coupled to a plurality of hosts respectively associated with a plurality of group identifiers. The method includes generating a source public key based on a source private key, a source group identifier of the plurality of group identifiers, and a destination group identifier of the plurality of group identifiers. The method includes sending, from the source node coupled to at least one host associated with the source group identifier to a destination node coupled to at least one host associated with the destination group identifier, the source public key. The method also includes receiving, at the source node from the destination node, a destination public key based on a destination private key, the source group identifier, and the destination group identifier. The method further includes generating a shared secret based on the destination public key and the source private key.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

Security of data transmitted over a fabric network is an important objective. As the number of hosts (or endpoint devices) in a fabric network increases and the amount of data transmitted between them similarly increases, the opportunity to break encryption used on the data grows larger. Accordingly, in various implementations, granularity of encryption is increased by using a shared secret that is specific to a source-group/destination-group pair. Accordingly, if the shared secret is discovered or divulged, communication between different group pairs is not compromised. Further, this level of granularity provides a balance between security and computational processing and storage (which may be too high if the shared secret was granularized to an endpoint-endpoint pair).

Figure 1:
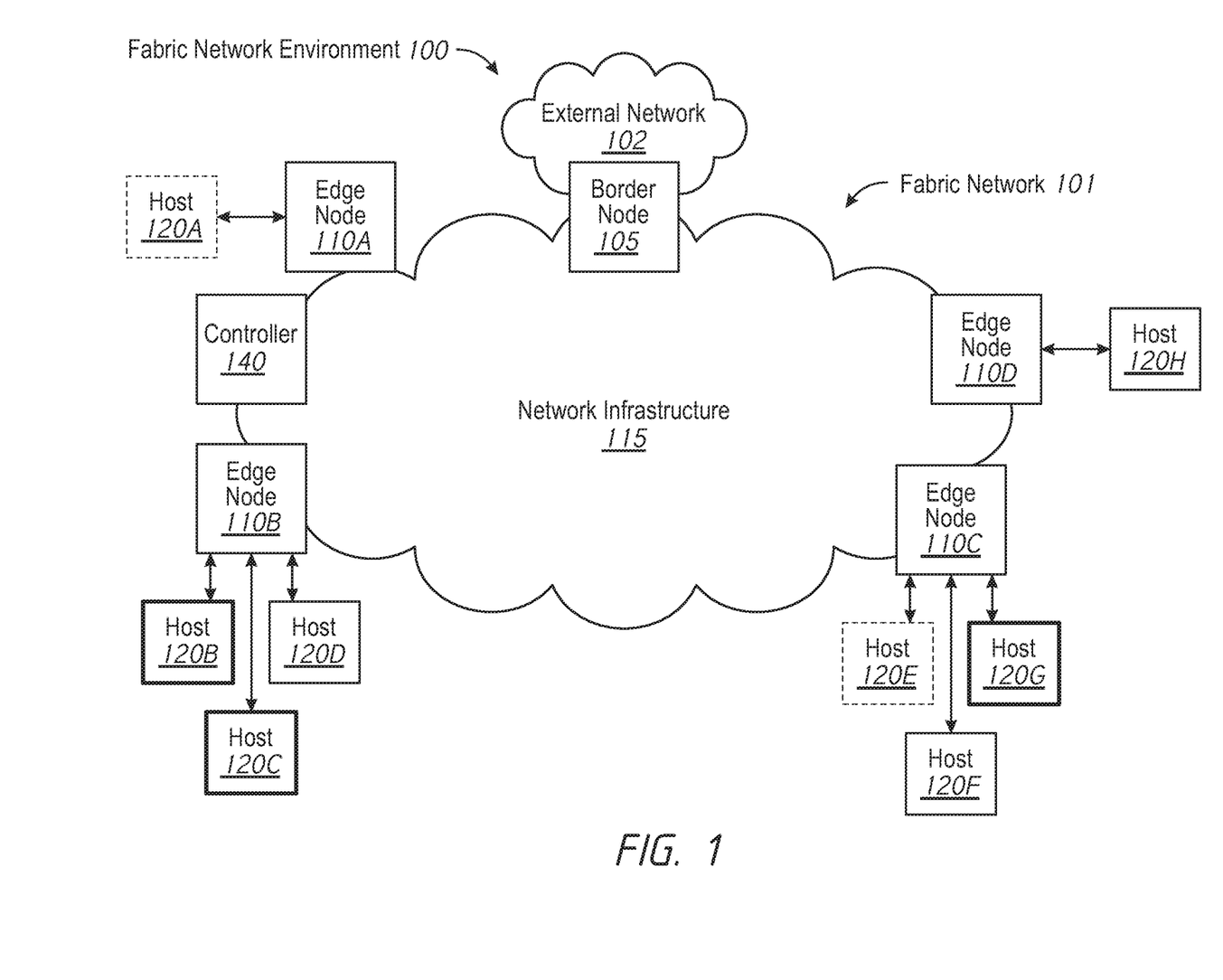
FIG. 1 is a block diagram of a fabric network environment in accordance with some implementations.

FIG. 1 illustrates a fabric network environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the fabric network environment 100 includes a fabric network 101 coupled to one or more external networks 102 and one or more hosts 120A-120H. The fabric network 101 includes one or more border nodes 105 coupled to the one or more external networks 102. Although FIG. 1 illustrates only a single external network 102 and a single border node 105, it is to be appreciated that, in various implementations, the fabric network 101 includes multiple border nodes coupled to multiple external networks.

In various implementations, the border node 105 connects the fabric network 101 to traditional Layer-3 networks or other fabric networks (which could be of the same or different type). Accordingly, in various implementations, the border node 105 admits, encapsulates/decapsulates, and forwards traffic to and from the external network 102 connected to the border node 105. In various implementations, the border node 105 includes a border pair (e.g. a pair of servers or routers acting as a single unit). The border pair can include, for example, a router device that routes traffic to and from the border node 105 and a control plane device that performs control plane functionality.

The fabric network 101 further includes a plurality of edge nodes 110A-110D coupled to the one or more hosts 120A-120H. In various implementations, one or more of the hosts 120A-120H includes a Layer-2 network, a wireless access point, or an endpoint device connected to a respective edge node 110A-110D. For example, the endpoint device can include a user device, such as a computer, a tablet, a smartphone. Each of the hosts 120A-120H is associated with a respective group identifier of a respective group. In various implementations, the groups include at least one of scalable groups, Virtual Local Area Networks (VLANs), Virtual Routing and Forwarding (VRFs), Virtual Network Interfaces (VNIs), Bridge Domains (BDs), and/or the like. In various implementations, the group identifier is an SGT (security group tag) or a VN-ID (virtual network identifier).

In various implementations, the edge nodes 110A-110D admit, encapsulate/decapsulate, and forward traffic to and from the hosts 120A-120H connected to the edge nodes 110A-110D. Although the hosts 120A-120H of FIG. 1 are illustrated as directly attached to respective edge nodes 110A-110D, it is to be appreciated that, in some embodiments, one or more of the hosts 120A-120H are coupled to their respective edge nodes 110A-110D via an intermediate Layer-2 network that lies outside the fabric network 101.

In the fabric network environment 100 of FIG. 1, the fabric network 101 includes a first edge node 110A coupled to a first host 120A (associated with a first group identifier as illustrated by a dashed line); a second edge node 110B coupled to a second host 120B (associated with a second group identifier as illustrated by a thick line), a third host 120C (associated with the second group identifier), and a fourth host 120D (associated with a third group identifier as illustrated by a thin line); a third edge node 110C coupled to a fifth host 120E (associated with the first group identifier), a sixth host 120F (associated with the third group identifier), and a seventh host 120G (associated with the second group identifier); and a fourth edge node 110D coupled to an eighth host 120H (associated with the third group identifier). In various implementations, one or more of the edge nodes 110A-110D includes a switch or router (e.g., an ingress tunnel router (ITR), an egress tunnel router (ETR), and/or a combination thereof (xTR)).

The fabric network 101 further includes a network infrastructure 115 including one or more interconnected intermediate nodes (e.g., switches or routers) that couple the border node 105 to the edge nodes 110A-110D (and the edge nodes 110A-110D to each other). In various implementations, the intermediate nodes provide the Layer-3 underlay transport service to fabric traffic. Thus, the intermediate nodes are Layer-3 forwarders that interconnect the edge nodes 110A-110D and border node 105. In some embodiments, the intermediate nodes may be capable of inspecting the fabric metadata and could apply policies based on the fabric metadata. However, in various implementations, all policy enforcement is performed by the edge nodes 110A-110D and border node 105.

Accordingly, in various implementations, the fabric network 101 implements a network topology where data traffic is passed through interconnecting switches, while providing the abstraction of a single Layer-2 and/or Layer-3 device. In various implementations, the fabric network 101 uses IPoverlay, which makes the fabric network 101 appear like a single virtual router/switch without the use of clustering technologies. In various implementations, the fabric network 101 provides seamless connectivity, independent of physical topology, with policy application and enforcement at the edges of the fabric (e.g., at the edge nodes 110A-110D and/or the border node 105).

The fabric network 101 further includes a network controller 140 which, among other things, establishes and manages the fabric network 101, including policy definition. In various implementations, the network controller 140 implements a map-system.

Figure 2:
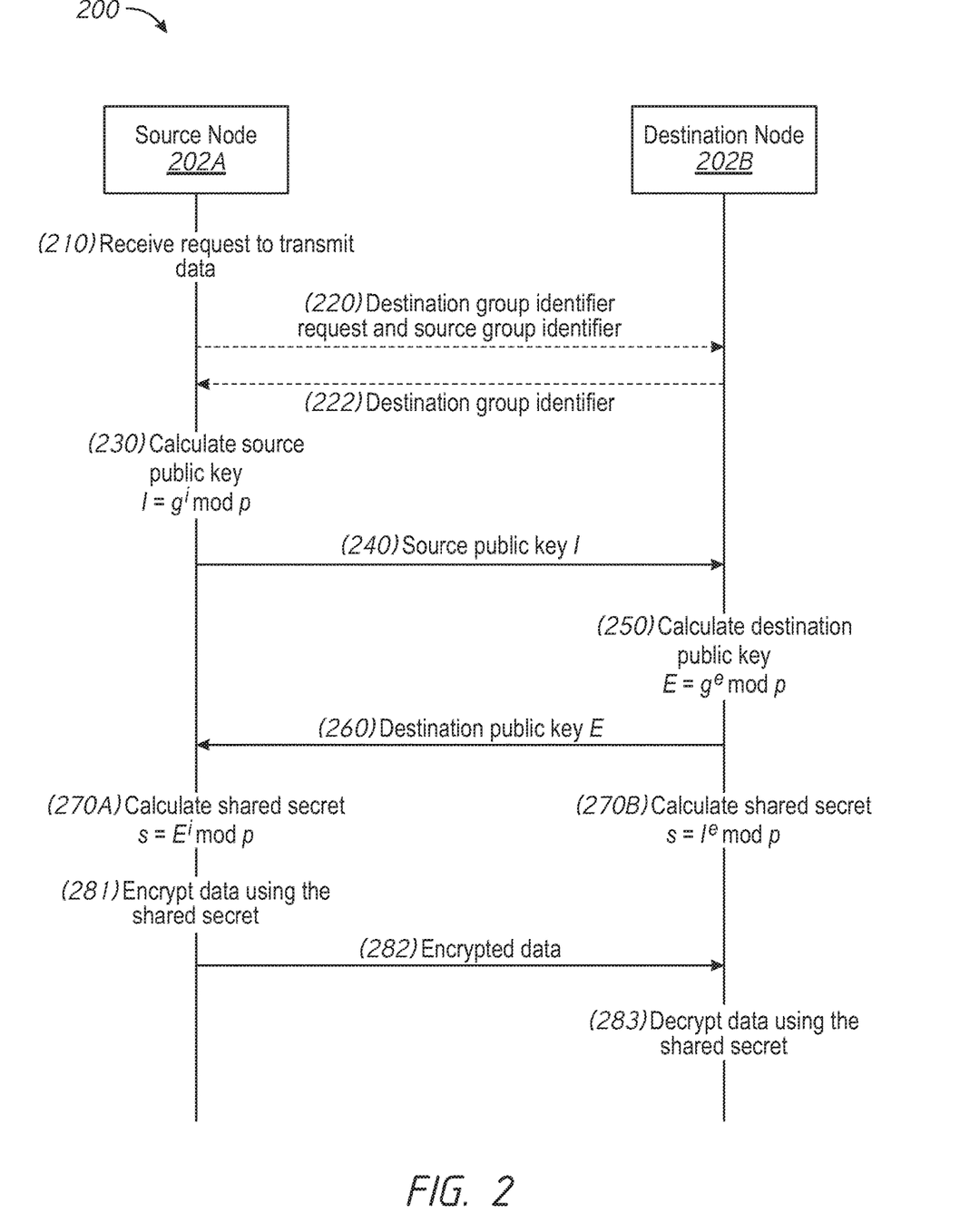
FIG. 2 is a flow diagram of a method of generating a shared secret in accordance with some implementations.

FIG. 2 is a flow diagram of a method 200 of generating a shared secret in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the method 200 is associated with a fabric network environment (e.g., the fabric network environment 100 in FIG. 1). The fabric network environment includes a fabric network (e.g., the fabric network 101 of FIG. 1) including (1) a source node 202A (e.g., edge node 110B of FIG. 1) coupled to one or more hosts (e.g., hosts 120B-120D) respectively associated with one or more group identifiers and (2) a destination node 202B (e.g., edge node 110C of FIG. 1) coupled to one or more hosts (e.g., hosts 120E-120G) associated with one or more group identifiers. In some embodiments, the method 200 is performed at least in part by the source node 202A and the destination node 202B to generate a shared secret for use in encrypting data between (1) a source host coupled to the source node 202A and associated with a source group identifier and (2) a destination host coupled to the destination node 202B and associated with a destination group identifier. In various implementations, each of the source node 202A and the destination node 202B is a tunnel router (xTR). In various implementations, the source node 202A is an ingress tunnel router (ITR) and the destination node 202B is an egress tunnel router (ETR).

The method 200 begins with the source node 202A receiving, at step 210, a request from the source host to transmit data to the destination host, such as a data packet from the source host addressed to the destination host. By virtue of being coupled to (and associated with) the source host, the source node 202A knows (e.g., stores in a storage module), at step 210, the source group identifier of the source host. In various implementations, the source node 202A also knows, at step 210, the destination group identifier of the destination host. However, in various implementations, the source node 202A does not know, at step 210, the destination group identifier. Accordingly, in various implementations, the method 200 optionally includes steps 220 in which the source node 202A requests the destination group identifier from the destination node 202B and transmits the source group identifier to the destination node 202B. In response, the method 200 optionally includes step 222 in which the source node 202A receives the destination group identifier from the destination node 202B. In various implementations, steps 220 and 222 are embodied in a preliminary map-request and/or a preliminary map-reply.

The method continues at step 230 in which the source node 202A calculates a source public key I based on a source private key i, the source group identifier, and the destination group identifier. The source private key i is a random (or, as encompassed by that term as used herein, pseudorandom) number generated by the source node 202A suitable for use as a cryptographic key. In some embodiments, the source private key i is specific to the source group identifier. In some examples, the value of the source private key i for different source group identifiers may be assumed to be different due to the statistical probability of the random number generator of the source node 202A not repeating a value. In some embodiments, the value of the source private key i can be locally assigned to be unique per source group identifier using a pool, a simple heuristic, and/or the like.

In various implementations, the source node 202A calculates the source public key I based on the source private key i, a source primary number p (based on the source group identifier), and a destination primary number g (based on the destination group identifier). The source primary number p is a prime number suitable for use in cryptography (typically a large primary number) selected based on the source group identifier. For example, in various implementations, the source primary number p is selected based on a mapping table and/or a mapping heuristic that maps the source group identifier to the source primary number p. Similarly, the destination primary number g is a prime number suitable for use in cryptography (typically a large primary number) selected based on the destination group identifier (e.g., using a mapping table and/or mapping heuristic).

In various implementations, the source node 202A calculates the source public key I as the destination primary number g raised to the power of the source private key i, modulo the source primary number p, e.g. ($I=g^i$ mod p).

At step 230, the source node 202A transmits the source public key I to the destination node 202B.

Upon receiving the source public key I from the source node 202A, the destination node 202B knows, at step 250, the source public key I, the source group identifier (and, by mapping, the source primary number p), and the destination group identifier (and, by mapping, the destination primary number g). At step 250, the destination node 202B calculates a destination public key E based on a destination private key e, the source group identifier, and the destination group identifier. The destination private key e is a random number generated by the destination node 202B suitable for use as a cryptographic key. In some embodiments, the destination private key e is specific to the destination group identifier. In some examples, the value of the destination private key e for different destination group identifiers may be assumed to be different due to the statistical probability of the random number generator of the destination node 202B not repeating a value. In some embodiments, the value of the destination private key e can be locally assigned to be unique per source group identifier using a pool, a simple heuristic, and/or the like.

In various implementations, the destination node 202B calculates the destination public key E based on the destination private key e, the source primary number p, and the destination primary number g. In various implementations, the destination node 202B calculates the destination public key E as the destination primary number g raised to the power of the destination private key e, modulo the source primary number p, e.g. ($E=g^e$ mod p).

At step 260, the destination node 202B transmits the destination public key E to the source node 202A.

At step 270A, the source node 202A calculates a shared secret s based on the destination public key E and the source private key i. In various implementations, the source node 202A calculates the shared secret s as the destination public key E raised to the source private key i, modulo the source primary number p, e.g. ($s=E^i$ mod p). Similarly, at step 270B, the destination node 202B calculates the shared secret s based on the source public key I and the destination private key e. In various implementations, the destination node 202B calculates the shared secret s as the source public key I raised to the destination private key e, modulo the source primary number p, e.g. ($s=I^e$ mod p).

Accordingly, after step 270A and step 270B, both the source node 202A and the destination node 202B know the shared secret s. Thus, at step 281, the source node 202A encrypts data from the source host using the shared secret s. At step 282, the source node 202A transmits the encrypted data to the destination host 202B. At step 283, the destination node 202B decrypts the encrypted data using the shared secret s and forwards the decrypted data to the destination host.

Thus, in various implementations, the source node 202A and destination node 202B calculate a shared secret using a Diffie-Hellman key exchange. In various implementations, the key exchange is performed using LISP (Location/ID Separation Protocol) signaling, such as map-request/reply signaling. However, as each public key (e.g., the source public key and the destination public key) is based on the source group identifier and the destination group identifier, the shared secret is unique to each node pair (based on the use of private keys at each node), to each group pair (based on the use of the source group identifier and the destination group identifier), and to each direction of communication (based on the asymmetry of the algorithm or formula used). Accordingly, discovery or divulgence of a particular shared secret does not compromise communication in the reverse direction, between different groups, or between different nodes.

As an example with respect to FIG. 1, to transmit encrypted data from the second host 120B to the fifth host 120E, the second edge node 110B generates a shared secret based on a destination public key that depends on the source group identifier (e.g., the second group identifier [indicated with a thick line]) and the destination group identifier (e.g., the first group identifier [indicated with a dashed line]). To transmit encrypted data from the third host 120C to the fifth host 120E, the same shared secret is used because the third host 120C and the second host 120B have the same group identifier (e.g., the second group identifier [indicated with a thick line]). To transmit encrypted data from the fourth host 120D to the fifth host 120E, a different shared secret is used because the fourth host 120D has a different group identifier than the second host 120B. Similarly, to transmit encrypted data back from the fifth host 120E to the second host 120B, a different shared secret is used because the source group identifier in the reverse transmission (e.g., the group identifier of the fifth host 120E, the first group identifier [indicated with a dashed line]) is different than source group identifier in the forward transmission (e.g., the group identifier of the second host 120B, the second group identifier [indicated with a thick line]).

Figure 3:
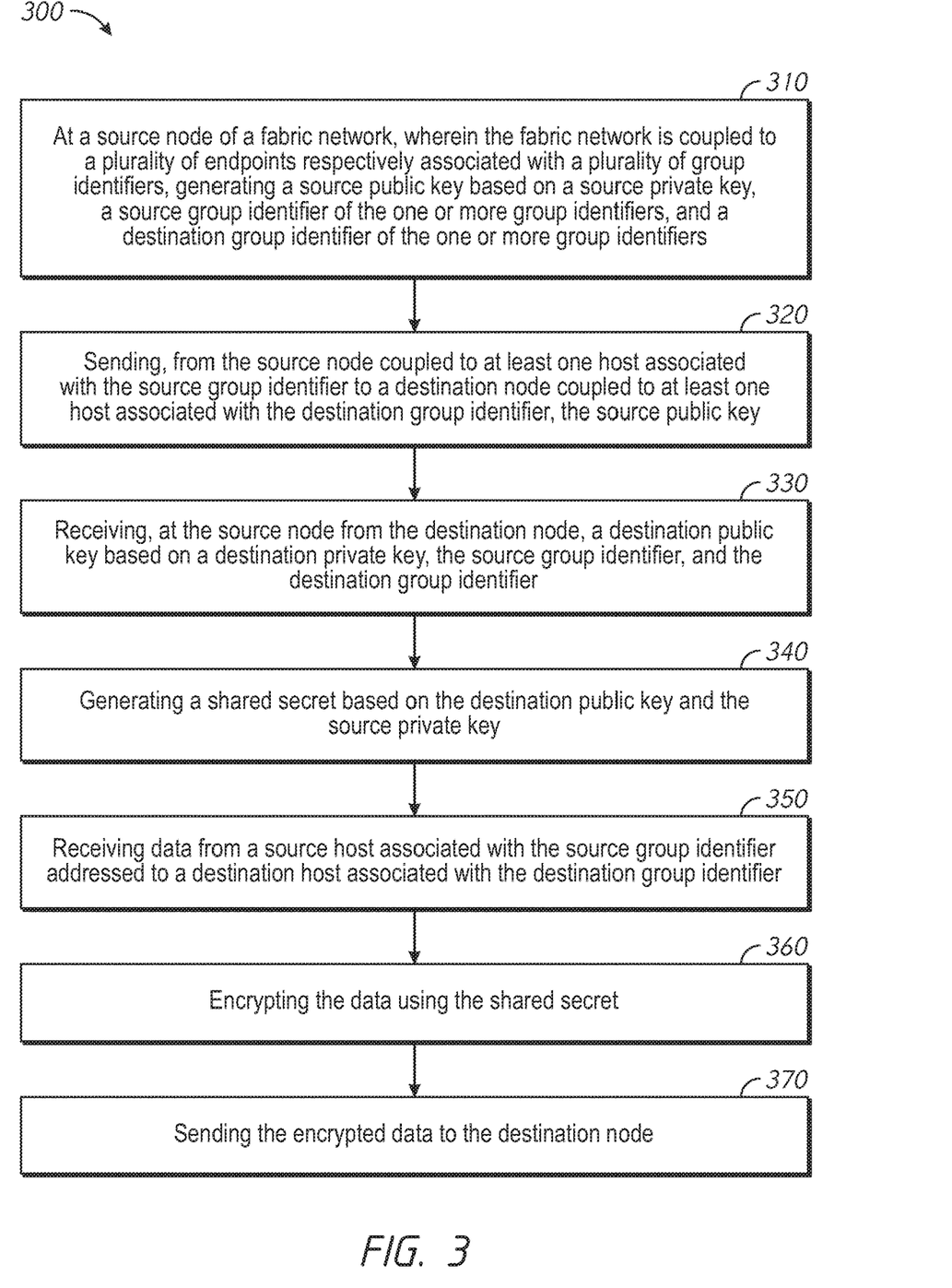
FIG. 3 is a flowchart representation of a method of encrypting and transmitting data from a source host to a destination host via a fabric network in accordance with some implementations.

FIG. 3 is a flowchart representation of a method 300 of encrypting and transmitting data from a source host to a destination host via a fabric network in accordance with some implementations. In some implementations, the method 300 is performed by an edge node of the fabric network, such as one of the edge nodes 110A-110D of FIG. 1, or a portion thereof. In some implementations, the method 300 is performed by processing logic, including hardware, firmware, software, or a combination thereof. In some implementations, the method 300 is performed by a processor executing code stored in a non-transitory computer-readable medium (e.g., a memory). In various implementations (and as detailed below as an example), the method 300 is performed by a source node of a fabric network, wherein the fabric network is coupled to a plurality of hosts respectively associated with a plurality of group identifiers. In various implementations, the plurality of group identifiers includes one or more identifiers for at least one of a scalable group, a Virtual Local Area Network (VLAN), a Virtual Routing and Forwarding (VRF), a Virtual Network Interface (VNI), a Bridge Domains (BD), and/or the like.

Briefly, the method 300 includes generating a shared secret based on a source group identifier of the source host and a destination group identifier of the destination host through the exchange of public keys, encrypting data from the source host addressed to a destination host using the shared secret, and transmitting the encrypted data to a destination node of the destination host.

The method 300 begins, in block 310, with the source node generating a source public key based on a source private key, a source group identifier of the plurality of group identifiers, and a destination group identifier of the plurality of group identifiers. In various implementations, the source private key is a random (or pseudorandom) number generated by the source node (and known only to the source node) suitable for use as a cryptographic key.

In various implementations, the source node generates the source public key based on a source private key, a source primary number based on the source group identifier, and a destination primary number based on the destination group identifier. In various implementations, the source primary number is a prime number suitable for use in cryptography (typically a large primary number) selected based on the source group identifier. For example, in various implementations, the source primary number is selected based on a mapping table and/or a mapping heuristic that maps the source group identifier to the source primary number. Similarly, in various implementations, the destination primary number is a prime number suitable for use in cryptography (typically a large primary number) selected based on the destination group identifier (e.g., using a mapping table and/or mapping heuristic). Accordingly, in various implementations, the source node maps the source group identifier to a source primary number and maps the destination group identifier to a destination primary number, wherein the source public key is based on the source private key, the source primary number, and the destination primary number.

In various implementations, the source node generates the source public key as the destination primary number g raised to the power of the source private key i, modulo the source primary number p, e.g. ($I=g^i \mod p$).

In various implementations, prior to generating the source public key based on the destination group identifier, the source node requests and receives the destination group identifier (e.g., from the destination node, a map-system thereof, or a separate map-system). Accordingly, in various implementations, the source node sends a preliminary map-request to a map-system to obtain the destination group identifier and receives the destination group identifier from the map-system. In some embodiments, the map-system is located within the destination node. In various implementations, the source node sends a map-request to a map-system to determine the destination node to which the destination host is coupled and receives an indication of the destination node (e.g., the RLOC [routing locator]) to which the destination host is coupled.

The method 300 continues, in block 320, with the source node (which is coupled to at least one host associated with the source group identifier, e.g., the source host) sending, to a destination node (which is coupled to at least one host associated with the destination group identifier, e.g., the destination host), the source public key.

The method 300 continues, in block 330, with the source node receiving, from the destination node, a destination public key based on a destination private key, the source group identifier, and the destination group identifier.

The method 300 continues, in block 340, with the source node generating a shared secret based on the destination public key and the source private key. In various implementations, the source node generates the shared secret based on the destination public key, the source private key, and the source group identifier. In various implementations, the source node generates the shared secret based on the destination public key, the source private key, and the source primary number. In various implementations, the source node generates the shared secret as the destination public key raised to the source private key, modulo the source primary number, e.g. ($s=E^i \mod p$).

The method 300 continues, in block 350, with the source node receiving data from a source host associated with the source group identifier addressed to a destination host associated with a destination group identifier.

The method 300 continues, in block 360, with the source node encrypting the data using the shared secret.

The method 300 continues, in block 370, with the source node sending the encrypted data to the destination node.

The destination node generates the shared secret based on the source public key and the destination private key. In various implementations, the destination node generates the shared secret based on the source public key, the destination private key, and the source group identifier. In various implementations, the destination node generates the shared secret based on the source public key, the destination private key, and the source primary number. In various implementations, the destination node generates the shared secret as the source public key raised to the destination private key, modulo the source primary number, e.g. ($s=Ie \mod p$).

The destination node decrypts the received encrypted data using the shared secret and forwards the decrypted data to the destination host.

As described above, the shared secret is node-pair specific, group-pair specific, and direction specific. Accordingly, in various implementations, the method 300 is repeated for a second group pair.

Thus, the source node generates a second source public key based on a second source private key, a second source group identifier of the plurality of group identifiers, and a second destination group identifier of the plurality of group identifiers, wherein the second source group identifier is different than the source group identifier or the second destination group identifier is different than the destination group identifier. In various implementations, the second source private key is different than the source private key when the second source group identifier is different than the source group identifier. Thus, different source group identifiers are associated with different source private keys.

The source node sends, to the destination node, the second source public key, wherein the second source public key is different than the source public key. The source node receives, from the destination node, a second destination public key based on a second destination private key, the second source group identifier, and the second destination group identifier. The source node generates a second shared secret based on the second destination public key and the second source private key, wherein the second shared secret is different than the shared secret.

As described above, the shared secret is node-pair specific, group-pair specific, and direction specific. Accordingly, in various implementations, the method 300 is repeated for the reverse channel between the source node and the destination node.

The source node receives, from the destination node, a reverse-path destination public key based on the destination private key, the source group identifier, and the destination group identifier, wherein the reverse-path destination public key is different than the destination public key. In various implementations, the reverse-path destination public key is determined as the source primary number raised to the power of the destination private key, modulo the destination primary number g, e.g. ($E_{reverse}=p^e$ mod g). Accordingly, the reverse-path destination public key is determined using the same algorithm or formula as the destination public key, but with the source primary number and the destination primary number swapped.

The source node sends, to the destination node, a reverse-path source public key based on the source private key, the source group identifier, and the destination group identifier, wherein the reverse-path source public key is different than the source public key. In various implementations, the reverse-path source public key is determined as the source primary number raised to the power of the source private key, modulo the destination primary number, e.g. ($I_{reverse}=p^i$ mod g). Accordingly, the reverse-path source public key is determined using the same algorithm or formula as the source public key, but with the source primary number and the destination primary number swapped.

The source node generates a reverse-path shared secret based on the reverse-path destination public key and the source private key, wherein the reverse-path shared secret is different than the shared secret. In various implementations, the source node determines the reverse-path shared secret as the reverse-path destination public key raised to the source private key i, modulo the destination primary number, e.g. ($s_{reverse}=E^i$ mod g). Accordingly, the reverse-path shared secret is determined using the same algorithm or formula as the shared secret, but with the source primary number and the destination primary number swapped. Thus, in various implementations, the reverse-path shared secret is determined using the same algorithm or formula as the shared secret, but with the source group identifier and the destination group identifier swapped.

Figure 4:
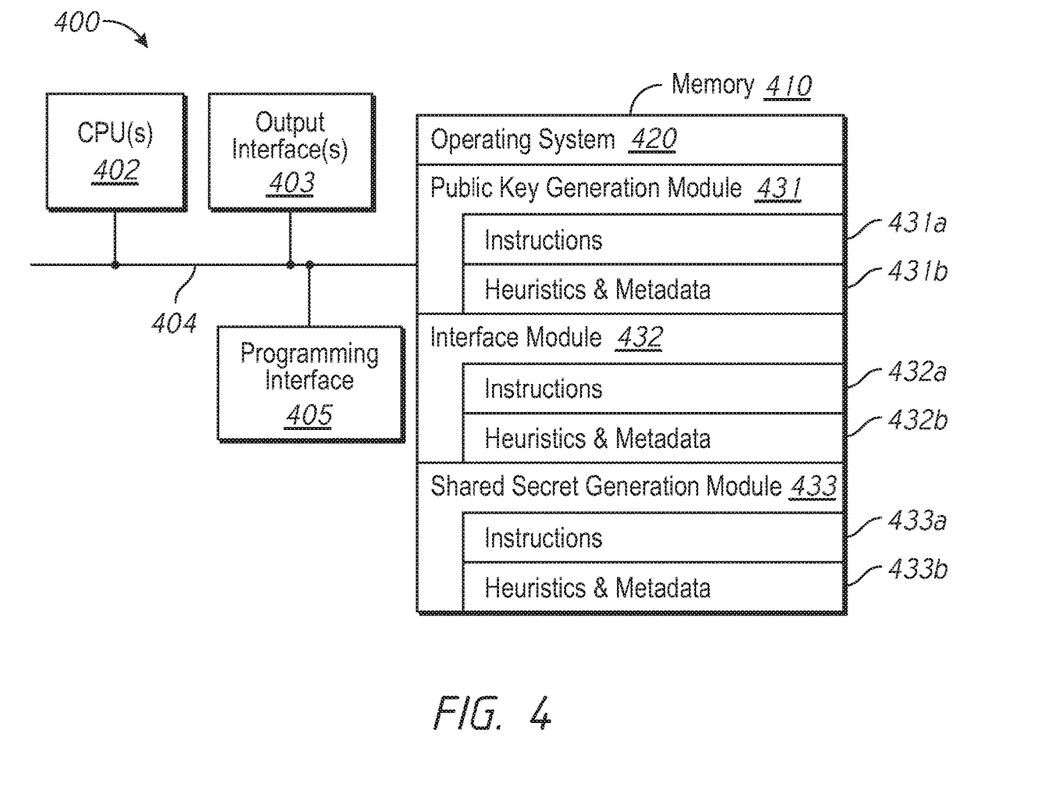
FIG. 4 is a block diagram of an example device in accordance with some implementations.

FIG. 4 is a block diagram of an example device 440 in accordance with some implementations. In some embodiments, the device corresponds to one of the edge nodes 110A-110D, the border node 105, or one of the hosts 120A-120H of FIG. 1 and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some embodiments, the device 400 includes one or more processing units (CPU(s)) 402 (e.g., processors), one or more output interfaces 403 (e.g., a network interface), a memory 410, a programming interface 405, and one or more communication buses 404 for interconnecting these and various other components.

In some implementations, the communication buses 404 include circuitry that interconnects and controls communications between system components. The memory 410 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 410 optionally includes one or more storage devices remotely located from the CPU(s) 402. The memory 410 comprises a non-transitory computer readable storage medium. Moreover, in some implementations, the memory 410 or the non-transitory computer readable storage medium of the memory 410 stores the following programs, modules and data structures, or a subset thereof including an optional operating system 420, a public key generating module 431, an interface module 432, and a shared secret generating module 433. In some embodiments, one or more instructions are included in a combination of logic and non-transitory memory. The operating system 420 includes procedures for handling various basic system services and for performing hardware dependent tasks.

In some embodiments, the public key generation module 431 is configured to generating a source public key based on a source private key, a source group identifier of the one or more group identifiers, and a destination group identifier of the one or more group identifiers. To that end, the public key generation module 431 includes a set of instructions 431a and heuristics and metadata 431b.

In some embodiments, the interface module 432 is configured to send, to a destination node coupled to at least one host associated with the destination group identifier, the source public key and is configured to receive, from the destination node, a destination public key based on a destination private key, the source group identifier, and the destination group identifier. To that end, the interface module 432 includes a set of instructions 432a and heuristics and metadata 432b.

In some embodiments, the shared secret generation module 433 is configured to generate a shared secret based on the destination public key and the source private key. To that end, the shared secret generation module 433 includes a set of instructions 433a and heuristics and metadata 433b.

Although the public key generation module 431, the interface module 432, and the shared secret generation module 433 are illustrated as residing on a single device 400, it should be understood that in other embodiments, any combination of the public key generation module 431, the interface module 432, and the shared secret generation module 433 can reside in separate devices. For example, in some embodiments, each of the public key generation module 431, the interface module 443, and the shared secret generation module 433 reside in a separate device.

Moreover, FIG. 4 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a source node of a fabric network, wherein the fabric network is coupled to a plurality of hosts respectively associated with a plurality of group identifiers,
      generating a source public key based on a source private key, a source group identifier of the plurality of group identifiers, and a destination group identifier of the plurality of group identifiers;
      sending, from the source node coupled to at least one host associated with the source group identifier to a destination node coupled to at least one host associated with the destination group identifier, the source public key;
      receiving, at the source node from the destination node, a destination public key based on a destination private key, the source group identifier, and the destination group identifier;
      generating a shared secret based on the destination public key and the source private key;
      receiving, at the source node from the destination node, a reverse-path destination public key based on the destination private key, the source group identifier, and the destination group identifier, wherein the reverse-path destination public key is different than the destination public key;
      sending, from the source node to the destination node, a reverse-path source public key based on the source private key, the source group identifier, and the destination group identifier, wherein the reverse-path source public key is different than the source public key; and
      generating a reverse-path shared secret based on the reverse-path destination public key and the source private key.

2. The method of claim 1, further comprising:
   receiving data from a source host associated with the source group identifier addressed to a destination host associated with the destination group identifier;
   encrypting the data using the shared secret; and
   sending the encrypted data to the destination node.

3. The method of claim 1, further comprising mapping the source group identifier to a source primary number and mapping the destination group identifier to a destination primary number, wherein the source public key is based on the source private key, the source primary number, and the destination primary number.

4. The method of claim 3, wherein the source public key is the destination primary number raised to the power of the source private key, modulo the source primary number.

5. The method of claim 3, wherein the shared secret is the destination public key raised to the power of the source private key, modulo the source primary number.

6. The method of claim 1, wherein further comprising, prior to generating the source public key, sending a preliminary map-request to a map-system to obtain the destination group identifier.

7. The method of claim 2, wherein further comprising sending a map-request to a map-system to obtain an identity of the destination node to which the destination host is coupled.

8. The method of claim 1, further comprising:
   at the source node, generating a second source public key based on a second source private key, a second source group identifier of the plurality of group identifiers, and a second destination group identifier of the plurality of group identifiers, wherein the second source group identifier is different than the source group identifier or the second destination group identifier is different than the destination group identifier:

sending, from the source node to the destination node, the second source public key, wherein the second source public key is different than the source public key;

receiving, at the source node from the destination node, a second destination public key based on a second destination private key, the second source group identifier, and the second destination group identifier; and generating a second shared secret based on the second destination public key and the second source private key, wherein the second shared secret is different than the shared secret.

9. The method of claim 1, wherein the reverse-path shared secret is determined using the same algorithm or formula as the shared secret, but with the source group identifier and the destination group identifier swapped.

10. The method of claim 1, wherein the source group identifier is associated with at least one of a scalable group, a Virtual Local Area Network (VLANs), a Virtual Routing and Forwarding (VRF), a Virtual Network Interfaces (VNI), or a Bridge Domain (BD).

11. A source node of a fabric network, wherein the fabric network is coupled to a plurality of hosts respectively associated with a plurality of group identifiers, the source node comprising:

a processor configured to generate a source public key based on a source private key, a source group identifier of the plurality of group identifiers, and a destination group identifier of the plurality of group identifiers; and a network interface configured to:

send, from the source node coupled to at least one host associated with the source group identifier to a destination node coupled to at least one host associated with the destination group identifier, the source public key; and receive, at the source node from the destination node, a destination public key based on a destination private key, the source group identifier, and the destination group identifier, wherein the processor is further configure to generate a shared secret based on the destination public key and the source private key, receive, at the source node from the destination node, a reverse-path destination public key based on the destination private key, the source group identifier, and the destination group identifier, wherein the reverse-path destination public key is different than the destination public key, send, from the source node to the destination node, a reverse-path source public key based on the source private key, the source group identifier, and the destination group identifier, wherein the reverse-path source public key is different than the source public key, and generate a reverse-path shared secret based on the reverse-path destination public key and the source private key.

12. The source node of claim 11, wherein:

the network interface is further configured to receive data from a source host associated with the source group identifier addressed to a destination host associated with the destination group identifier;

the processor is further configured to encrypt the data using the shared secret; and the network interface is further configured to send the encrypted data to the destination node.

13. The source node of claim 11, wherein the processor is further configured to map the source group identifier to a source primary number and map the destination group identifier to a destination primary number, wherein the source public key is based on the source private key, the source primary number, and the destination primary number.

14. The source node of claim 13, wherein the source public key is the destination primary number raised to the power of the source private key, modulo the source primary number.

15. The source node of claim 13, wherein the shared secret is the destination public key raised to the power of the source private key, modulo the source primary number.

16. A non-transitory computer-readable medium at a source node of a fabric network, wherein the fabric network is coupled to a plurality of hosts respectively associated with a plurality of group identifiers, wherein the non-transitory computer-readable medium encodes instructions which, when executed by a processor of the source node, cause the source node to:

generate a source public key based on a source private key, a source group identifier of the plurality of group identifiers, and a destination group identifier of the plurality of group identifiers;

send, from the source node coupled to at least one host associated with the source group identifier to a destination node coupled to at least one host associated with the destination group identifier, the source public key;

receive, at the source node from the destination node, a destination public key based on a destination private key, the source group identifier, and the destination group identifier;

generate a shared secret based on the destination public key and the source private key;

receive, at the source node from the destination node, a reverse-path destination public key based on the destination private key, the source group identifier, and the destination group identifier, wherein the reverse-path destination public key is different than the destination public key;

send, from the source node to the destination node, a reverse-path source public key based on the source private key, the source group identifier, and the destination group identifier, wherein the reverse-path source public key is different than the source public key; and generate a reverse-path shared secret based on the reverse-path destination public key and the source private key.

17. The non-transitory computer-readable medium of claim 16, wherein the instructions further cause the source node to:

receive data from a source host associated with the source group identifier addressed to a destination host associated with the destination group identifier;

encrypt the data using the shared secret; and send the encrypted data to the destination node.

18. The non-transitory computer-readable medium of claim 16, wherein the instructions further cause the source node to map the source group identifier to a source primary number and map the destination group identifier to a destination primary number, wherein the source public key is based on the source private key, the source primary number, and the destination primary number.

19. The non-transitory computer-readable medium of claim 18, wherein the source public key is the destination primary number raised to the power of the source private key, modulo the source primary number, and wherein the shared secret is the destination public key raised to the power of the source private key, modulo the source primary number.

* * * * *